Aug. 28, 1945.　　　　L. T. MILLER　　　　2,383,878
LUBRICATION SYSTEM CONTROL VALVE
Original Filed July 16, 1941　　4 Sheets-Sheet 1

INVENTOR
LESLIE T. MILLER
BY
George Douglas Jones.
ATTORNEY

Aug. 28, 1945.  L. T. MILLER  2,383,878
LUBRICATION SYSTEM CONTROL VALVE
Original Filed July 16, 1941   4 Sheets-Sheet 2

INVENTOR
LESLIE T. MILLER
BY
ATTORNEY

Aug. 28, 1945.　　　　　L. T. MILLER　　　　　2,383,878
LUBRICATION SYSTEM CONTROL VALVE
Original Filed July 16, 1941　　4 Sheets-Sheet 3

INVENTOR.
LESLIE T. MILLER
BY George Douglas Jones.
ATTORNEY

Aug. 28, 1945.    L. T. MILLER    2,383,878
LUBRICATION SYSTEM CONTROL VALVE
Original Filed July 16, 1941    4 Sheets-Sheet 4
FIGURE 6.
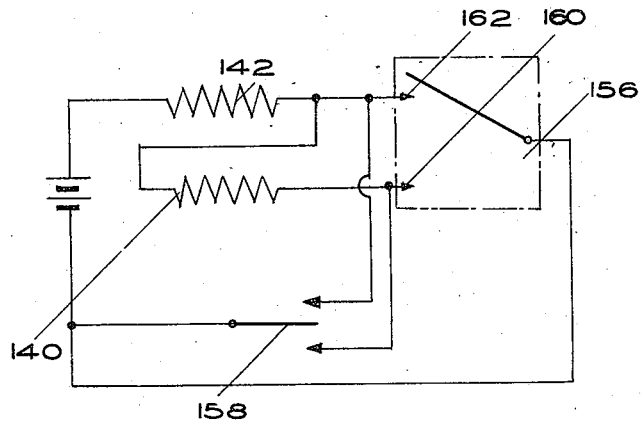
FIGURE 7.    FIGURE 8.
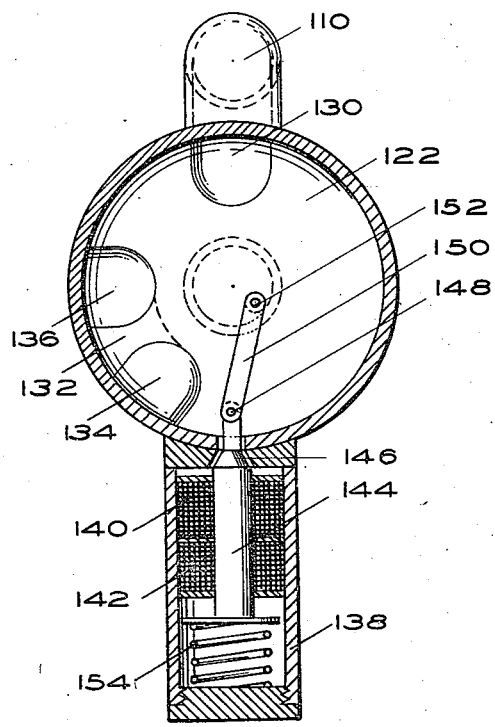
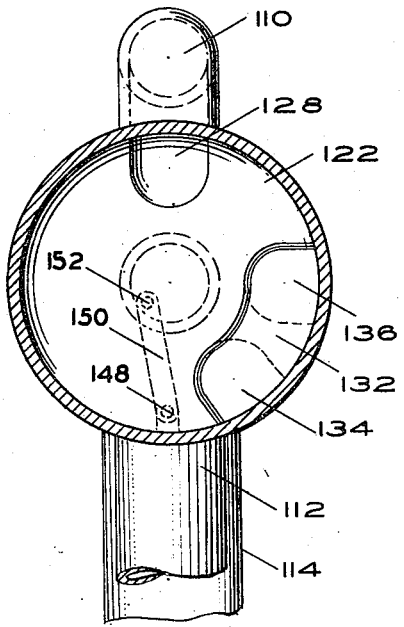
INVENTOR
LESLIE T. MILLER
BY
*George Douglas Jones*
ATTORNEY Patented Aug. 28, 1945

2,383,878

UNITED STATES PATENT OFFICE 2,383,878

LUBRICATION SYSTEM CONTROL VALVE

Leslie T. Miller, Stoneleigh, Md., assignor to The Glenn L. Martin Company, Middle River, Md., a corporation of Maryland Original application July 16, 1941, Serial No. 402,569, now Patent No. 2,311,069, dated February 16, 1943. Divided and this application October 3, 1942, Serial No. 460,641

4 Claims. (Cl. 236—34)

This invention relates to the features, construction and function of a lubricant and diluent control valve, and is a division of application Serial Number 402,569, filed July 16, 1941, now Patent Number 2,311,069 issued February 16, 1943.

It is well known that the usual lubricating oils thicken when cooled, and therefore do not provide proper lubrication. The introduction of a lighter, less viscous lubricant during periods of starting, when the engine is cold, has been suggested. However, no satisfactory arrangement for introducing the diluting lubricant into the system has been provided.

The present invention is particularly applicable to a system which includes an oil cooler and an oil tank having a warm-up compartment. It has been found that in the usual system, the forcing of cold oil through the oil cooler reduces the efficiency of the pump and is likely to damage the oil cooler.

The primary object of the present invention is to provide a simple yet effective construction for ensuring proper lubrication of the engine at all temperatures, while reducing the pressures required and avoiding damage to the system.

Another object of the invention is to provide a simple means for introducing a diluent, upon starting or just before stopping the engine, into the oil in a lubricating system, in such a manner as to ensure its proper distribution through, and thorough admixture with, at least that portion of the oil which will be used for lubrication, upon the next cold starting of the engine.

Another object of the invention is to provide a means to cause the oil to flow directly to the warm-up compartment, regardless of the temperature of the lubricant and at the same time add a diluent so that a quantity of low viscosity lubricant may be provided for the next cold starting of the engine.

A further object of the invention is to produce an arrangement of this type which avoids the flow of cold oil through the oil cooler so as to prevent damage thereto. More particularly, means are furnished for by-passing the oil cooler when so desired.

Still another object of the invention is to provide a valve arrangement for automatically permitting the flow of diluent when oil is being by-passed around the oil cooler, this valve closing off the diluent when the normal flow through the oil cooler is reestablished.

An additional object of the invention is to arrange an electrical control for simultaneously by-passing the oil cooler and admitting a diluent to the system.

Still a further object of the invention is to provide both a manual means, operable at will, and an automatic means, responsive to the temperature of the oil, for regulating the by-passing and the diluent introduction.

Further advantages and other objects will become apparent from the description of the accompanying drawings which form a part of this disclosure and in which like numerals refer to like parts.

In the drawings:

Figure 6 is a circuit diagram of the solenoid and control circuit.

Figures 7 and 8 are sectional views of the right and left ends respectively of the valve shown in Figure 5.

Figure 1:
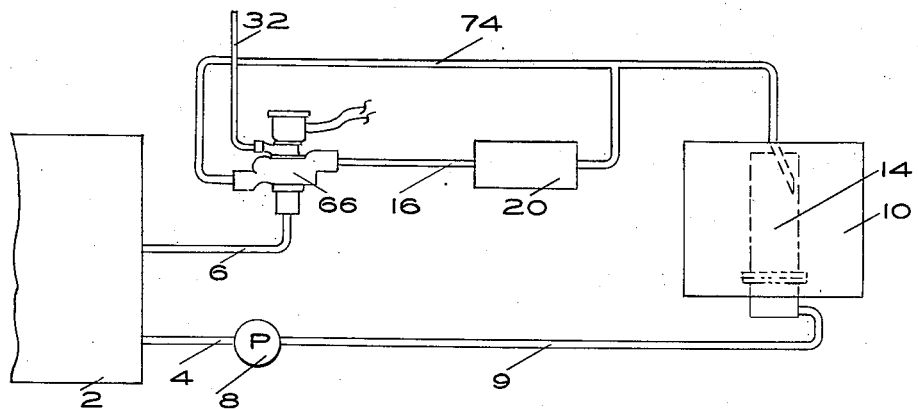
Figure 1 illustrates the system with which the control valve is used.

The lubricating system shown in Figure 1, comprises an engine 2, a control valve 66, an oil cooler 20, and an oil reservoir 10 having a warm up compartment 14. Supply line 9 conducts oil from the base of the reservoir to pump 8 and then through conduit 4 to the engine. Return line 6 conducts oil to the control valve 66 which directs the oil through line 74 or through line 16 and the oil cooler 20. Pipe 32 is shown conducting diluent to the control valve.

Figure 3:
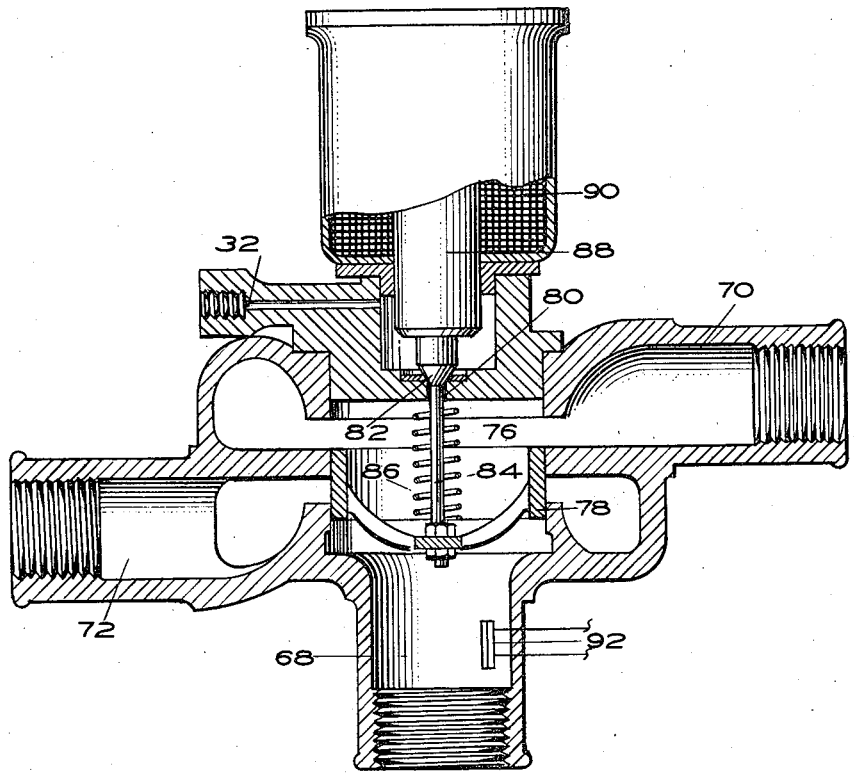
Figure 3 is a cross-sectional view of the control valve illustrated in Figure 1.

The valve 66 is shown in detail in Figure 3. It has an oil inlet 68 for connecting to engine oil outlet 6; a normal oil outlet 70 connected by line 16 to oil cooler 20; and a second oil outlet 72 connected by line 74 to tank 10. Inlet 68 leads into a cylindrical chamber 76 which has two rings of ports or ring ports connected to outlets 70 and 72 respectively. A sleeve 78 slidable in the cylinder can cover one or the other of these sets of ports.

In the top of the chamber 76 is a diluent inlet 80 connected to pipe 32. This is controlled by a conical valve portion 82 on a rod 84 which is connected to sleeve 78. A coil spring 86 normally holds sleeve 78 in its lower position, so as to close outlet 72. Rod 84 is connected to the core 88 of a solenoid 90, so as to raise the rod when the solenoid is energized.

Figure 2:
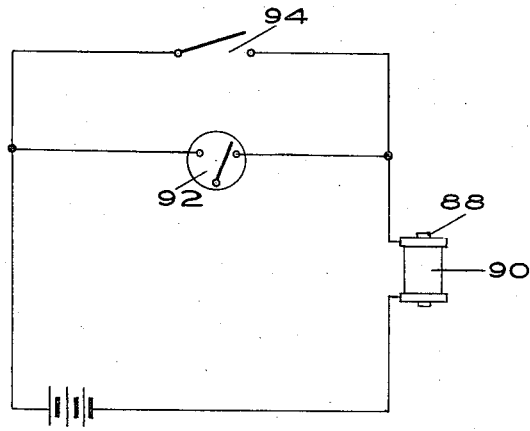
Figure 2 is a circuit diagram of the connections for manual and thermostatic operation of the solenoid valve.

Arranged in the oil inlet 68 is a thermostat 92 which is connected to solenoid 90 by the circuit shown in Figure 2. A manual switch 94 is also provided in this circuit.

The operation is as follows: Normally, oil flows from the engine to inlet 68 and through outlet 70 to the oil cooler. If the oil is too cold, however, thermostat 92 is closed and energizes solenoid 90. This raises rod 84 and moves sleeve 78 up to close the ports to normal outlet 70 and open them to by-pass outlet 72. At the same time, valve 82 is raised and permits the diluent to enter through inlet 80. Thus the oil is simultaneously diluted and passed around the oil cooler. Before stopping the engine, the introduction of diluent may be obtained by closing manual switch 94.

Figure 4:
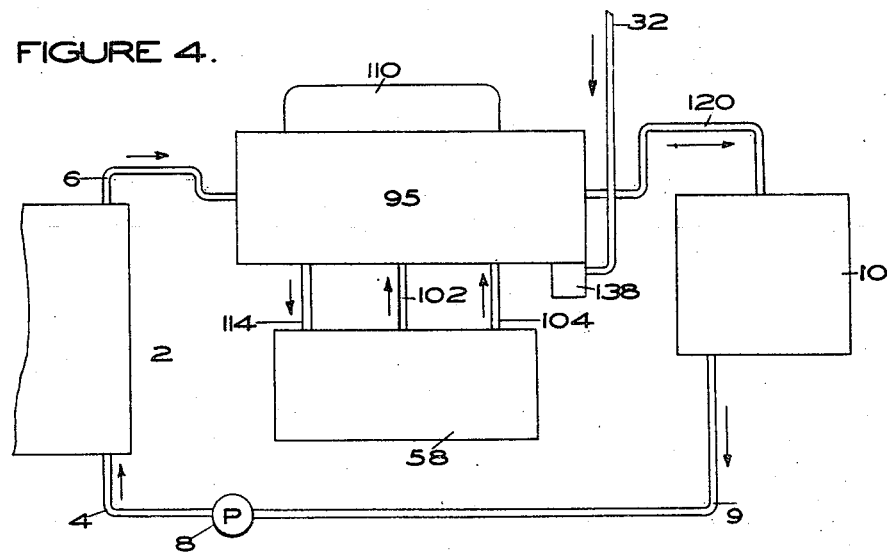
Figure 4 illustrates a modified form of the lubrication system embodying a solenoid operated valve.
Figure 5:
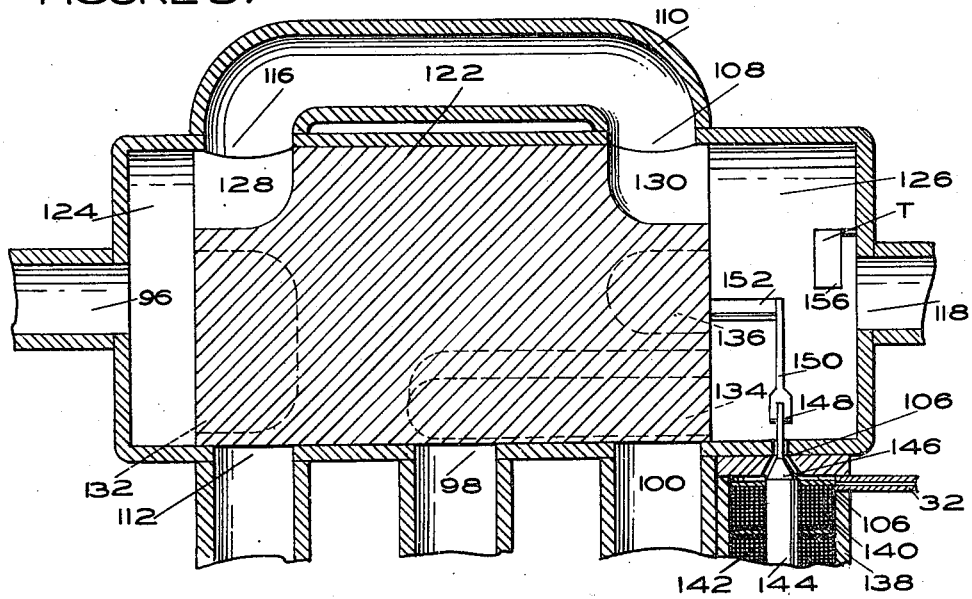
Figure 5 is a cross-sectional view through the control valve.

Figure 4 shows a circuit using an oil cooler of the conventional type having a core section and a jacket section, in the latter section only limited cooling takes place. The oil may be directed through the jacket section only, for limited cooling or through both the jacket and core, which affords maximum cooling. This modification of the system utilizes the valve 95 shown in Figures 5, 7 and 8. This valve has inlets 96 for connection to the engine oil outlet 6; 98, 100 for connection to the jacket and core respectively of oil cooler 58 by pipes 102, 104 respectively; 106, for connection to diluent supply pipe 32; and 108 for a by-pass 110; as well as outlets 112 leading by pipe 114 to oil cooler 58; 116 leading to by-pass 110; and 118 leading to oil tank 10 by pipe 120.

Within the valve is a body 122 mounted to turn. This is shorter than the casing so as to provide chambers 124, 126 at the ends. Passages 128, 130 are provided in opposite ends to provide connections to outlet 116 and inlet 108 respectively. Passage 132 connects with outlet 112, while passages 134, 136 can connect with inlet 98, 100 respectively.

A depending chamber 138 near outlet 118 contains two solenoid coils 140, 142 each adapted to operate on a core 144. This core has a conical valve portion 146 adapted to close inlet 106. Pivoted to the core at 148 is a link 150 which is also pivotally connected to a pin 152 extending from an eccentric point in the end face of valve body 122. A coil spring 154 normally urges core 144 upward.

In chamber 126 is arranged a two-contact thermostat 156, the contacts of which are connected, by the circuit shown in Figure 6, to one and both, respectively, of the coils 140 and 142. A manual switch 158 for selectively energizing coils 140, 142 may also be provided.

This device operates in the following manner: Normally, oil from the engine will flow from the engine to chamber 124, passage 132, pipe 114, jacket and core of oil cooler 58, pipe 104, passage 136, chamber 126 and outlet 118 to tank 10. If, however, the engine is cold, thermostat 156 will close the lower contact 160 and will energize both coils 140, 142. This will pull core 144 fully down and through link 150 will turn valve body 122 to the position shown in the drawings. Oil will then flow through chamber 124, passage 128, by-pass 110, passage 130 and chamber 126 to outlet 118. At the same time, valve surface 146 will be moved down to open the diluent inlet 106, so as to permit the diluent to enter and mix with the lubricant.

As the oil warms up, thermostat 156 moves to the upper contact 162 and energizes only coil 142. This permits partial upward movement of core 144, which turns valve 122 to an intermediate position in which passage 134 communicates with inlet 98. Oil then flows through the jacket only of the oil cooler.

While I have described herein some embodiments of my invention I wish it to be understood that I do not intend to limit myself thereby except within the scope of the appended claims.

I claim as my invention:

1. A valve for directing the flow of lubricant in a lubricating system comprising a housing having oil inlet port means and a plurality of oil outlet port means, a flow control valve mounted in said housing adjacent said outlet port means so that movement of said valve opens one outlet port at a time, valve actuating means including a solenoid to move the valve in a predetermined manner to direct the flow of lubricant from the inlet port to one of the outlet ports and including a secondary separate valve structure in said housing through which diluent is introduced into the flow of lubricant through said housing, so that when the flow control valve directs oil through one outlet port, the diluent valve is closed and when said first valve moves to direct the flow of oil through a second outlet port, the diluent valve is opened.

2. A valve for directing the flow of lubricant in a lubricating system comprising a housing having oil inlet port means and a plurality of oil outlet port means, a flow control valve mounted in said housing adjacent said outlet port means so that movement of said valve opens one outlet port at a time, valve actuating means to move the valve in a predetermined manner to direct the flow of lubricant from the inlet port to one of the outlet ports and including a secondary separate valve structure in said housing through which diluent is introduced into the flow of lubricant through said housing, so that when the flow control valve directs oil through one outlet port, the diluent valve is closed and when said first valve moves to direct the flow of oil through a second outlet port, the diluent valve is opened.

3. A valve for directing the flow of lubricant in a lubricating system comprising a housing having oil inlet port means and a plurality of oil outlet port means, a rotary flow control valve mounted in said housing adjacent said outlet port means so that movement of said valve opens one outlet port at a time, thermally responsive valve actuating means to move the valve in a predetermined manner to direct the flow of lubricant from the inlet port to one of the outlet ports and including a secondary separate valve structure in said housing through which diluent is introduced into the flow of lubricant through said housing, so that when the rotary flow control valve directs oil through one outlet port, the diluent valve is closed and when said rotary valve moves to direct the flow of oil through a second outlet port, the diluent valve is opened.

4. A valve for directing the flow of lubricant in a lubricating system comprising a housing having oil inlet port means and a plurality of oil outlet port means, an axially slidable flow control valve mounted in said housing adjacent said outlet port means so that movement of said valve opens one outlet port at a time, thermally responsive valve actuating means to move the valve in a predetermined manner to direct the flow of lubricant from the inlet port to one of the outlet ports and including a secondary separate valve structure in said housing through which diluent is introduced into the flow of lubricant through said housing, so that when said flow control valve directs oil through one outlet port, the diluent valve is closed and when said axially slidable valve moves to direct the flow of oil through a second outlet port, the diluent valve is opened.

LESLIE T. MILLER.